(12) United States Patent
Su et al.

(10) Patent No.: US 7,334,063 B2
(45) Date of Patent: Feb. 19, 2008

(54) METHOD AND DEVICE FOR REGISTER ACCESS ACCORDING TO IDENTIFIER REGISTER

(75) Inventors: Ian Su, Shindian (TW); Roy Wang, Shindian (TW)

(73) Assignee: Via Technologies, Inc., Taipei (TW)

( * ) Notice: Subject to any disclaimer, the term of this patent is extended or adjusted under 35 U.S.C. 154(b) by 285 days.

(21) Appl. No.: 11/142,445

(22) Filed: Jun. 2, 2005

(65) Prior Publication Data

US 2006/0242366 A1   Oct. 26, 2006

(30) Foreign Application Priority Data

Apr. 20, 2005   (TW) ............................. 94112563 A

(51) Int. Cl.
*G06F 13/00* (2006.01)
(52) U.S. Cl. ............................. 710/52; 710/53; 710/55; 710/57; 710/260; 711/109; 711/154
(58) Field of Classification Search ............... 711/109, 711/110, 154, 156, 158; 365/78, 189.07, 365/221; 710/52, 53, 55, 57, 260
See application file for complete search history.

(56) References Cited

U.S. PATENT DOCUMENTS

| | | | |
|---|---|---|---|
| 6,108,742 A | | 8/2000 | Jeong et al. |
| 6,333,745 B1 * | | 12/2001 | Shimomura et al. ........ 345/535 |
| 2003/0061431 A1 * | | 3/2003 | Mears et al. ................ 710/305 |

FOREIGN PATENT DOCUMENTS

CN    1167298 A    12/1997

* cited by examiner

*Primary Examiner*—Hong Kim
(74) *Attorney, Agent, or Firm*—Birch, Stewart, Kolasch & Birch, LLP

(57) ABSTRACT

A method for accessing digital data information is used for reducing accessing time when a processor accesses digital data from a register. The method comprises the steps of accessing data from a register with a processor, continuously accessing data from the register with the processor if the data in the register is valid, enabling an identifier register with the processor if the data in the register is invalid, transmitting an interrupt signal to the processor, disabling the identifier register with the processor, and accessing the data from the register with the processor.

12 Claims, 7 Drawing Sheets

METHOD AND DEVICE FOR REGISTER ACCESS ACCORDING TO IDENTIFIER REGISTER

CROSS-REFERENCE TO RELATED APPLICATION

This application claims the benefit of Taiwan Patent Application Ser. No. 094112563, filed on Apr. 20, 2005, having the same inventorship hereof.

BACKGROUND OF THE INVENTION

1. Field of Invention

The invention relates to a data processing device and method and, in particular, to a device and method, which can reduce the accessing time when a processor accesses digital data from a register.

2. Related Art

In the recent years, human beings have entered the information time. The computer technology has well and fast developed, so that the digital products are flooded in our daily lives. Most people have one personal computer for dealing with their businesses and privacies. For example, they can use the computer to handle with many documents. For the entertainment purpose, the computer can be used to browse Internet or to play video medium.

The major elements of the computer include a processor, a storage unit and registers. In the view of the computer, it can only process the digital data. For instance, the computer can retrieve a video file and display it on the screen, or access data from an external storage media, process the data and then store the data in a hard drive. Both the data stored in the hard drive and the data accessed from the external storage media are temporarily stored in the registers for waiting the processor to read and process them.

In general, the processor of a multiplex operation system possesses the ability of sorting multiple procedures. When one procedure requests data from the register of the data processing device, it is desired to provide some solutions for the situation that the data are not prepared.

There are two conventional solutions as shown in FIG. 1 and FIG. 2 for the situation that the data of the register are not prepared. As shown in FIG. 1, the step S10 shows that the data to be processed are stored in the register and the processor is accessing the data from the register. The step S12 determines whether the data of the register are valid or not. When the data of the register are totally accessed by the processor and no new data is recorded in the register, the step S12 determines that the data of the register are invalid and the step S14 is performed. When the data of the register are sufficient for the processor, the step S12 determines that the data of the register are valid and the step S10 is then performed. The step S14 shows that the processor is in an inquiring state. In this case, the processor should check whether the register has new data for accessing all the time. In brief, the processor will wait for the register until the new data are recorded in the register, and then the step S10 can be performed. As mentioned above, this solution has one undesired problem. That is, in a procedure of accessing the register within a multiplex operation system environment, the processor will stay in the inquiring state as the data of the register are invalid. Thus, the processor may waste a lot of time on this inquiring state, and, relatively, spend fewer time on processing other procedures.

As shown in FIG. 2, the step S20 shows that the data to be processed are stored in the register and the processor is accessing the data from the register having an assumed capacity of 32 bytes. After the processor accesses through the 32 bytes data, the step S22 is performed to switch the processor to process other procedures. Not until the register stores another 32 bytes data, the interrupt signal is transmitted to the processor. The step S24 is then performed to receive the interrupt signal with the processor. After that, the current processed procedure is stopped, and the step S20 is performed to access the 32 bytes data from the register. As mentioned above, this solution, which is unlike the previous solution that has to inquire the state of the register all the time, will switch to other procedures once the processor accesses the 32 bytes data from the register. Thus, on the one hand the processor must process other procedures, and on the other hand the processor must wait for the interrupt signal. As a result, the processor must process one interrupt signal for every access of 32 bytes.

Please refer to FIG. 3 and FIG. 4 for the detailed description of the conventional problems. FIG. 3 shows the disadvantage of the procedures shown in FIG. 1. The blocks 30 shown in FIG. 3 mean the time periods in which the processor accesses the data from the register in the procedure A. The blocks 32 shown in FIG. 3 mean the time periods in which the processor can not access the data, which are invalid, from the register and continuously inquires and waits the register in the procedure A. As shown in FIG. 3, once the register has new data, the processor can perform the access action immediately. After the access action, the processor inquires and waits the register again. Thus, the processor wastes a lot of time on inquiring and waiting. In other words, the total time that the processor spent on the procedure A includes many blocks 32.

FIG. 4 shows the disadvantage of the procedures shown in FIG. 2. The blocks 40 shown in FIG. 4 mean the time periods in which the processor accesses the data from the register in the procedure A. The blocks 42 shown in FIG. 4 mean the time periods in which the processor can not access the data, which are invalid, from the register in the procedure A and switches to process the procedure B. The blocks 44 shown in FIG. 4 mean the time periods in which the processor processes the procedure B. As shown in FIG. 4, if the processor can not access the valid data from the register, it switches to the procedure B. Once the processor receives an interrupt signal showing that the register has new data for the procedure A, the processor will switch to process the procedure A again and then access the data from the register. Thus, the processor wastes a lot of time on switching between the procedures. In other words, the total time that the processor spent on the procedure A includes many blocks 42.

SUMMARY OF THE INVENTION

The invention provides a data processing method for reducing the accessing time when a processor accesses digital data from a register. The data processing method includes the following steps of: accessing the data from the register with the processor, continuously accessing the data with the processor if the data in the register is valid, enabling an identifier register with the processor if the data in the register is invalid, transmitting an interrupt signal to the processor when a predetermined ratio of the capacity of the register is loaded with new data, disabling the identifier register with the processor, and accessing the new data from the register with the processor.

In addition, the invention discloses a data processing device for reducing the accessing time when a processor accesses digital data from a register. The data processing device includes a register for temporarily storing data, a processor capable of accessing the data from the register, an identifier register indicating whether to transmit an interrupt signal to the processor, and a monitoring unit monitoring that whether a predetermined ratio of the capacity of the register is recorded with new data. In the invention, when the data accessed from the register with the processor are invalid, the content of the identifier register is set to 1. When the predetermined ratio of the capacity of the register is recorded with the new data and the content of the identifier register is set to 1, the interrupt signal is transmitted to the processor. When the processor receives the interrupt signal, the content of the identifier register is set to 0 and the data of the register are accessed.

When the data accessed from the register with the processor are invalid, the content of the identifier register is set to 1. That is, when the predetermined ratio of the capacity of the data processing device is loaded with data, the processor will wait for an interrupt signal. During the waiting time for the interrupt signal, the processor can process other procedures. This can improve the disadvantage of the first conventional solution that the processor spends a lot of time for inquiring whether the data are valid or not.

In the invention, the processor does not inquire the data from the data processing device all the time. Assuming that the processor gets data and the data processing device records no data, the data processing device will load the data immediately. Fortunately, before the processor inquires the next data, the data processing device has loaded the required data. Therefore, the processor can get the next valid data. During the above procedures, the content of the identifier register stays at 0, so that there is no interrupt signal generated for the processor after the data processing device loads the data. Thus, the disadvantage of the second conventional solution caused by the interrupt signals can be prevented.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

The invention provides a data processing method for reducing the accessing time when a processor accesses digital data from a register. As a result, the data can be efficiently processed by the processor.

Figure 1:
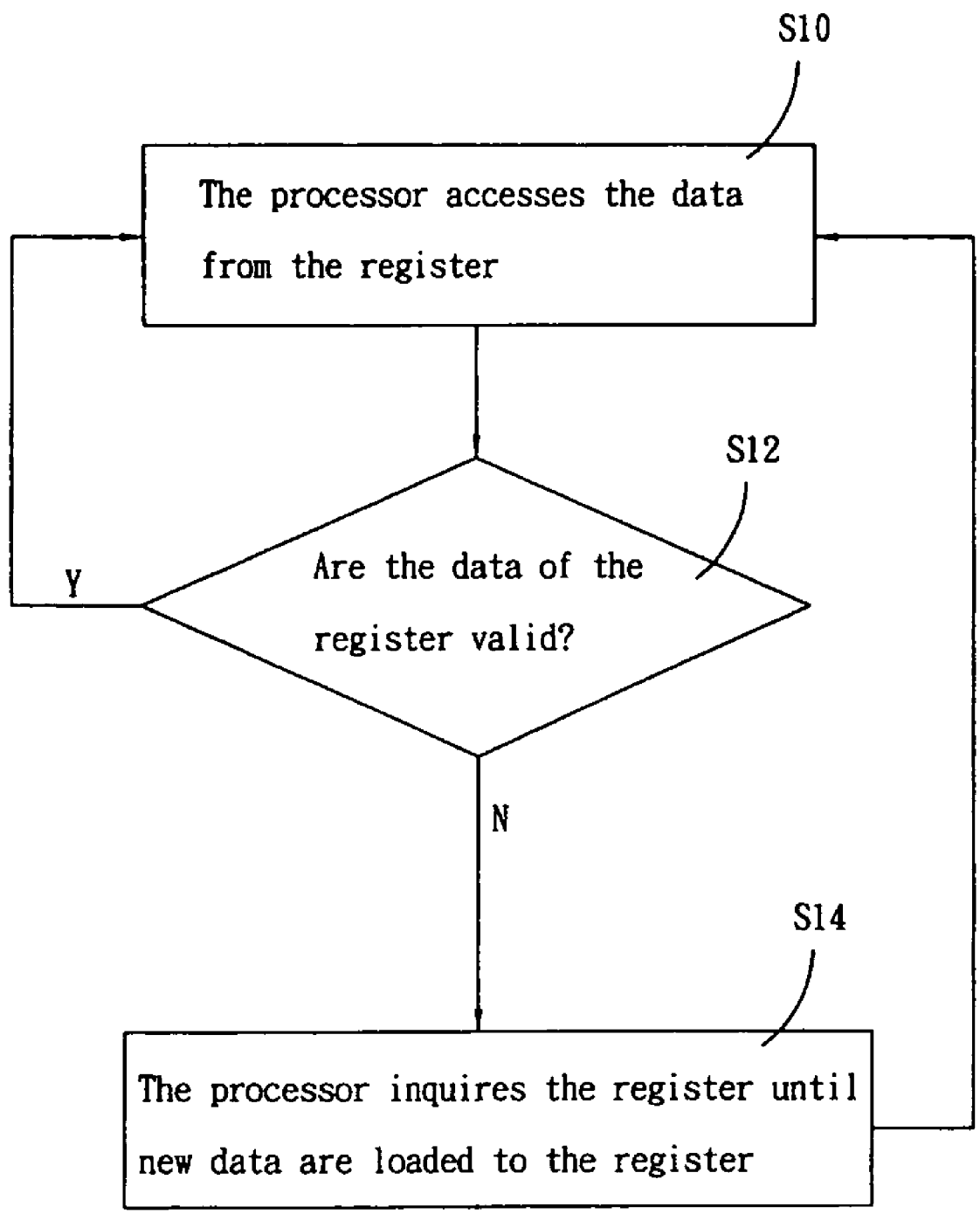
FIG. 1 is a flow chart showing the first conventional solution.
Figure 2:
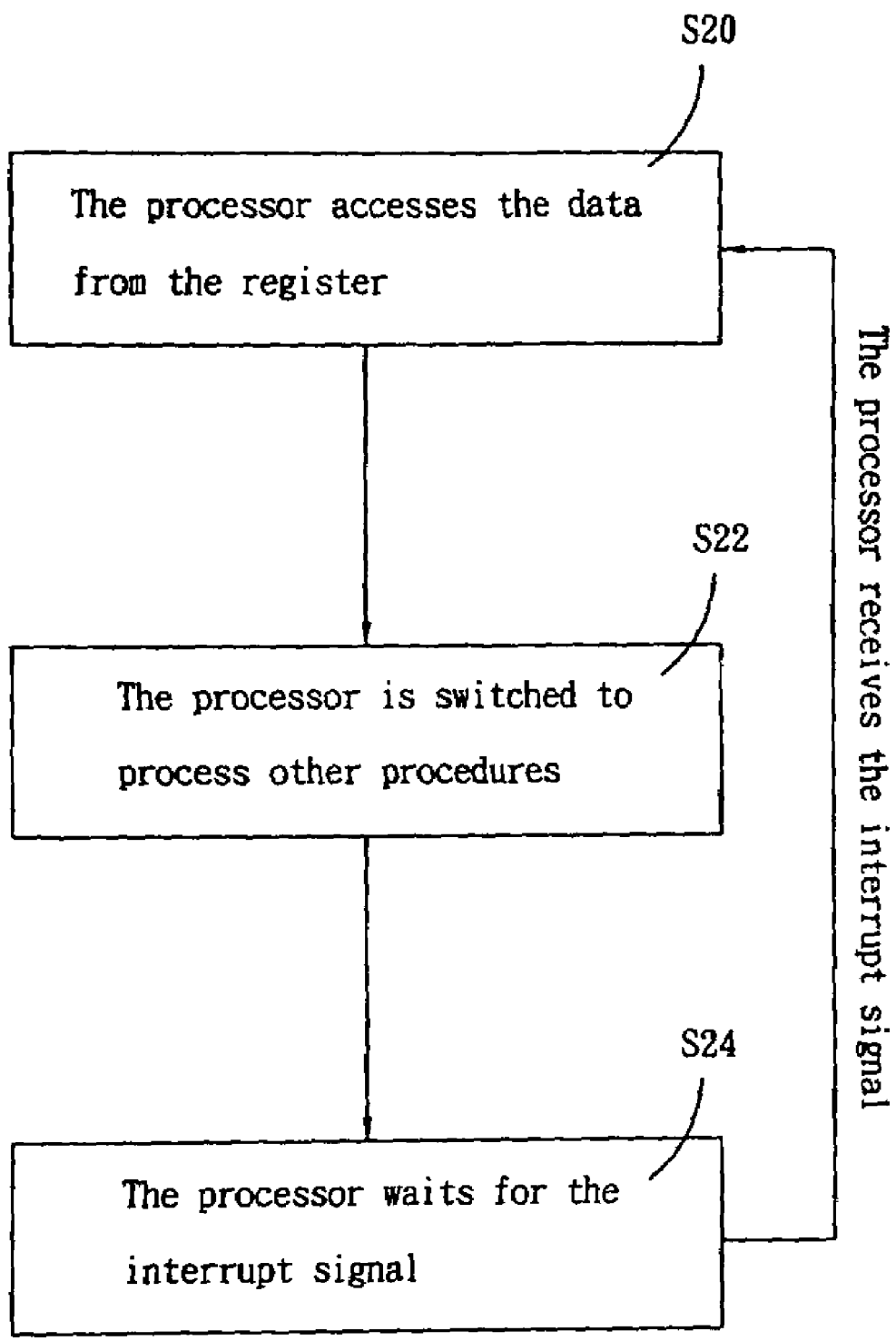
FIG. 2 is a flow chart showing the second conventional solution.
Figure 3:
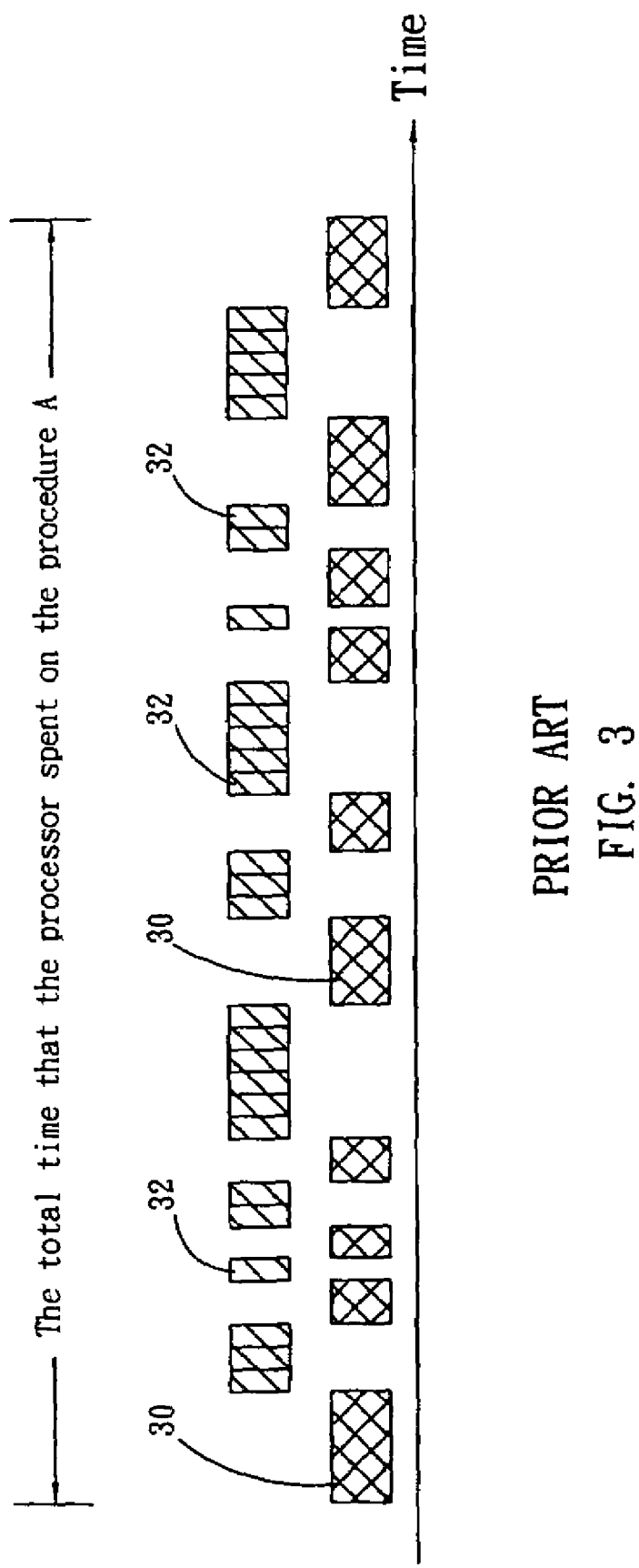
FIG. 3 is a schematic view showing the disadvantage of the first solution shown in FIG. 1.
Figure 5:
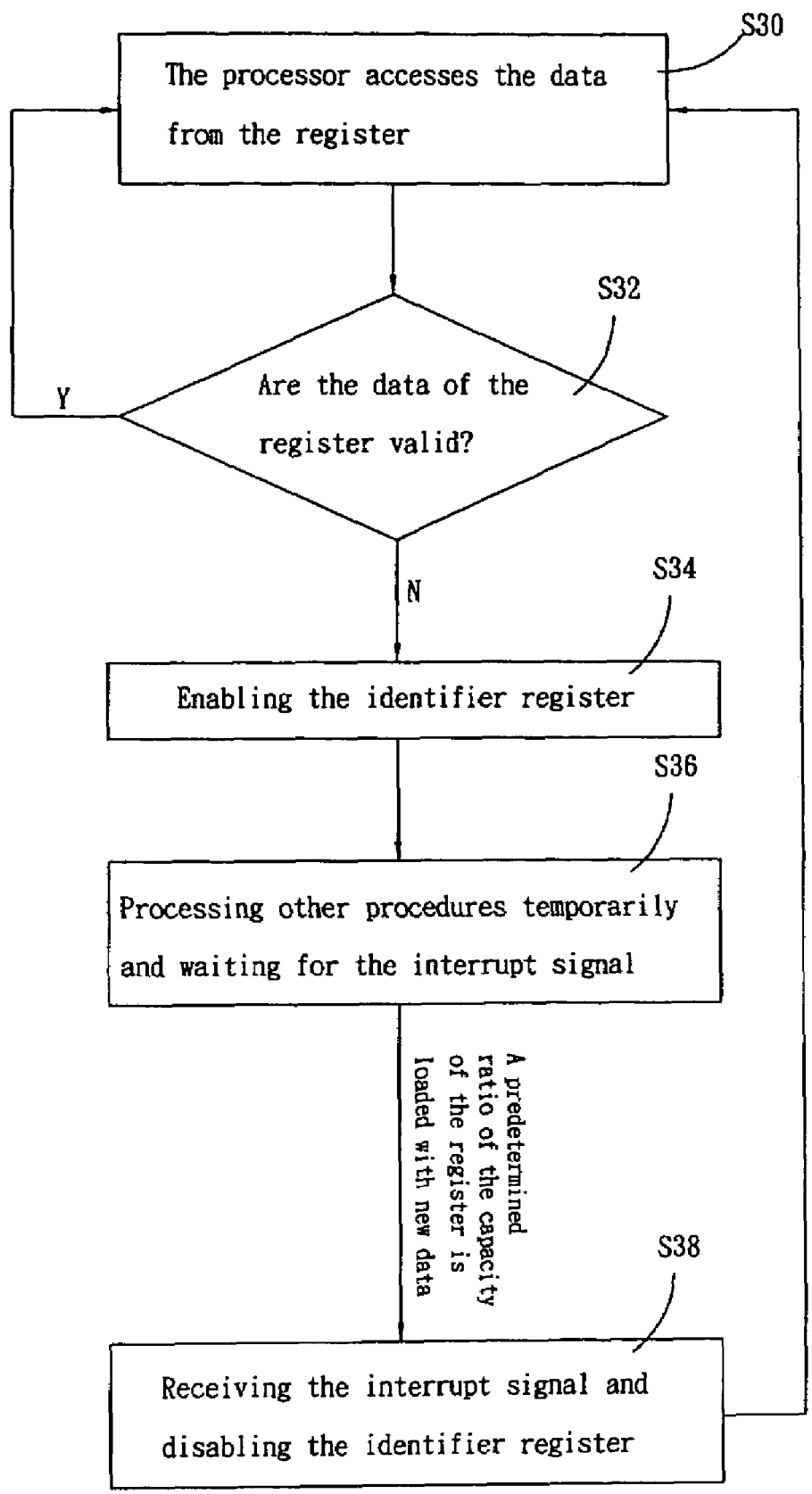
FIG. 5 is a flow chart showing a data processing method according to a preferred embodiment of the invention.

Please refer to FIG. 5, which is a flow chart showing the data processing method according to a preferred embodiment of the invention. The steps S30 to S32 are the same as those described in the related art with reference to FIG. 1, so the detailed descriptions are omitted for concise purpose. In the step S34, the processor enables an identifier register to present that the data to be processed are emergency. Thus, once the emergent data are received, the interrupt signal must be transmitted to the processor. Next, in the step S36, the processor may process other procedures temporarily and wait for the interrupt signal. When a predetermined ratio of the capacity of the register is loaded with new data and the identifier register is enabled, an interrupt signal is transmitted to the processor for announcing the processor to stop the current procedure. After the processor receives the interrupt signal, the processor disables the identifier register and accesses the new data from the register (step S38).

Figure 4:
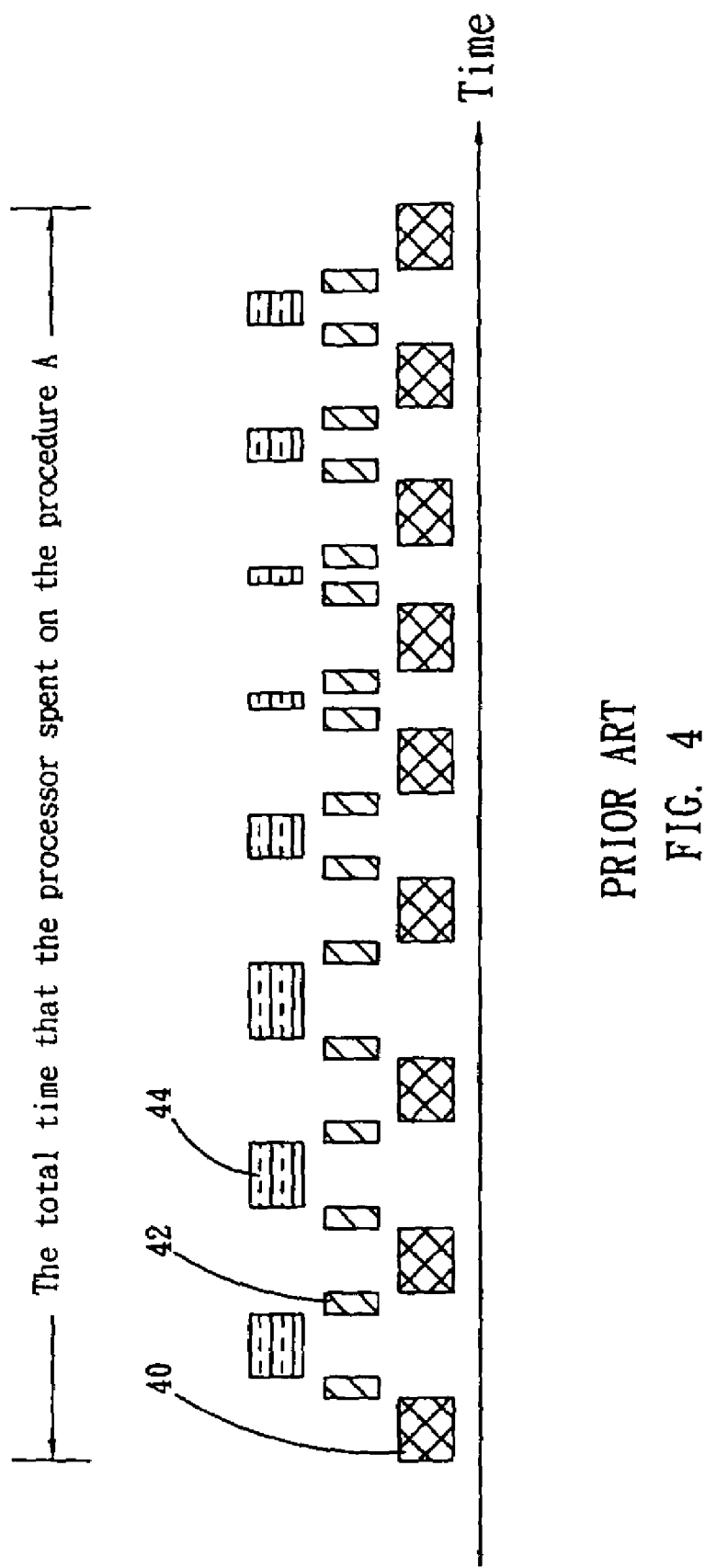
FIG. 4 is a schematic view showing the disadvantage of the second solution shown in FIG. 2.
Figure 6:
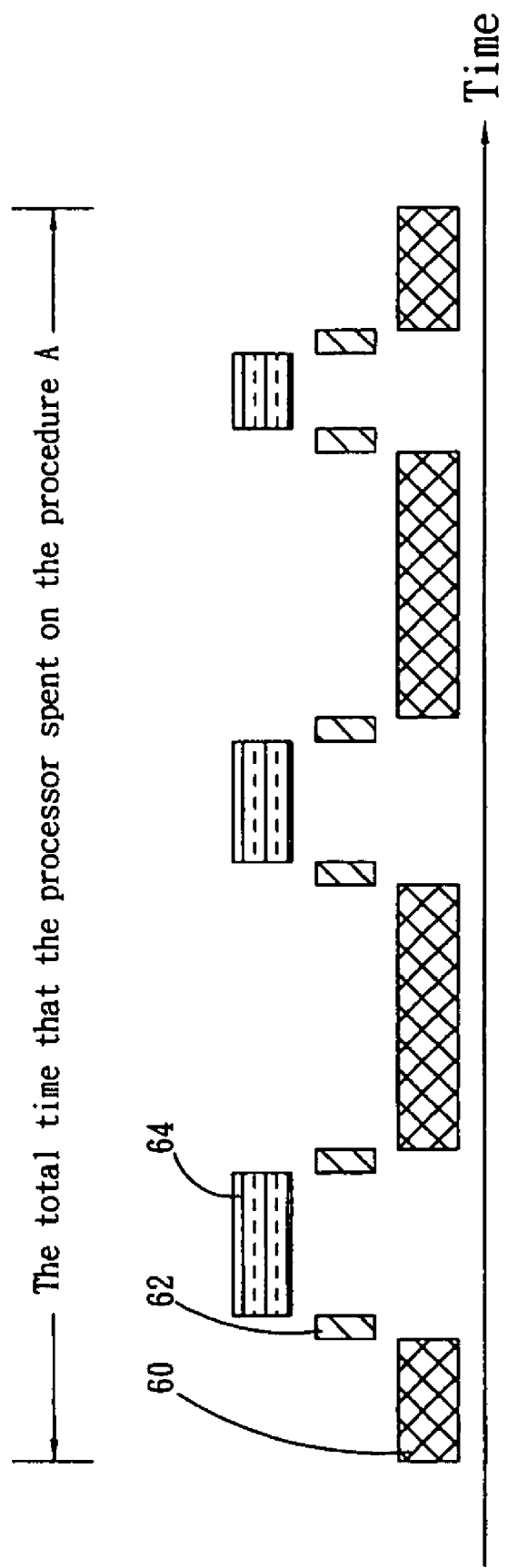
FIG. 6 is a schematic view showing the processing procedures of the processor according to a preferred embodiment of the invention.

Please refer to FIG. 6, which is a schematic view showing the processing procedures of the processor according to a preferred embodiment of the invention. The blocks 60 shown in FIG. 6 mean the time periods in which the processor accesses the data from the register in the procedure A. The blocks 62 shown in FIG. 6 mean the time periods in which the processor can not access the data, which are invalid, from the register in the procedure A and switches to process the procedure B. The blocks 64 shown in FIG. 6 mean the time periods in which the processor processes the procedure B. As shown in FIG. 6, if the processor can not access the valid data from the register, it switches to the procedure B. At this moment, the register is loading the data required for the procedure A until T1. At T1, a predetermined ratio of the capacity of the register is recorded with the data required for the procedure A. The predetermined ratio is, for example, larger than 50%. Then, an interrupt signal is transmitted to the processor for announcing that the register has recorded the data required for the procedure A. At T1, the processor will switch from the procedure B to the procedure A and access the data from the register. Accordingly, the time wasted for switching between the procedures can be sufficiently reduced. In other words, the total time that the processor spent on the procedure A includes less blocks 62 than the prior art (as shown in FIG. 4). At the same time, the processor can also process other procedure(s) such as the procedure B, so that the performance of the processor can be greatly increased. To be noted, the above-mentioned invalid data mean that there is no more required data for the procedure A in the register, or there is no data in the register. Similarly, "there is no valid data" means the same condition.

Figure 7:
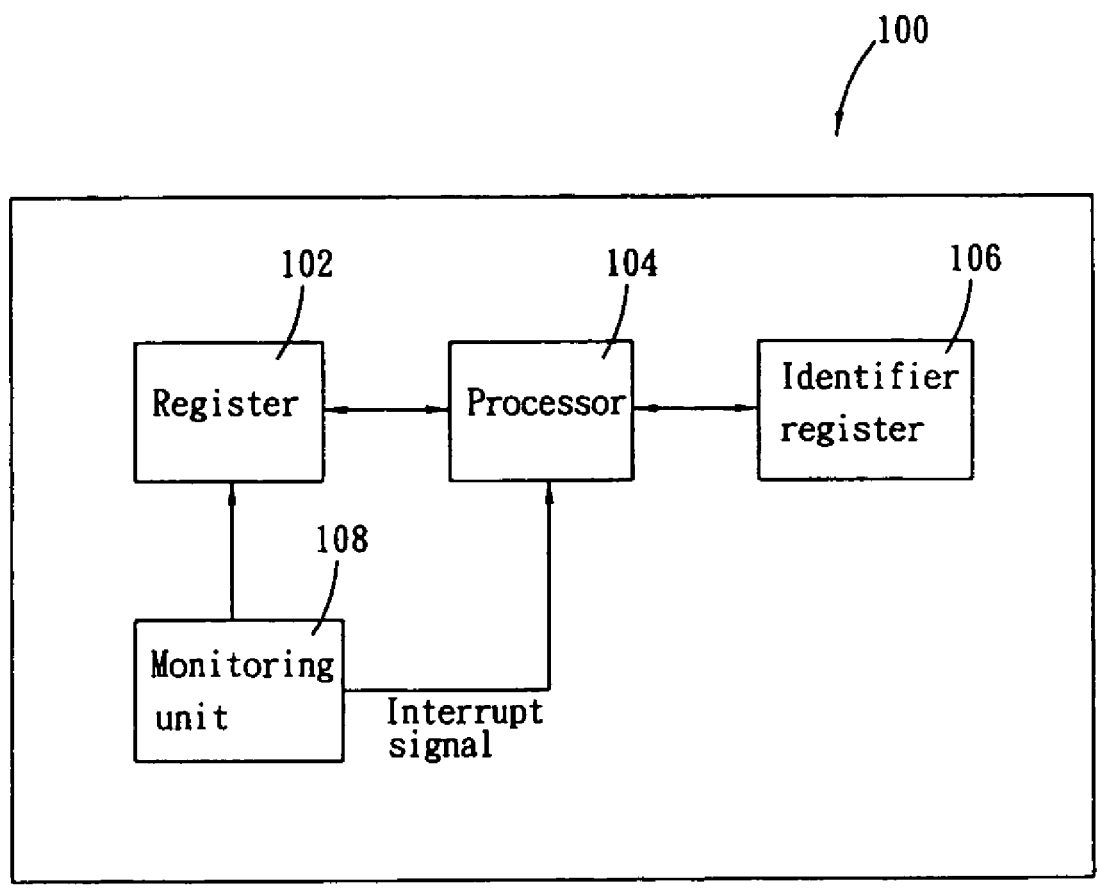
FIG. 7 is a schematic view showing a data processing device according to a preferred embodiment of the invention.

Please refer to FIG. 7, which is a schematic view showing a data processing device according to a preferred embodiment of the invention. The data processing device 100 includes a register 102, a processor 104, an identifier register 106, and a monitoring unit 108. The register 102 is used for temporarily storing data. The processor 104 connects to the register 102 for accessing the data from the register 102. The identifier register 106 connects to the processor 104. When the data of the register 102 are invalid, the processor 104 enables the identifier register 106. When receiving an interrupt signal, the processor 104 disables the identifier register 106. The monitoring unit 108 monitors that whether a predetermined ratio of the capacity of the register 102 is recorded with new data. When a predetermined ratio of the capacity of the register 102 is recorded with new data, the monitoring unit 108 transmits the interrupt signal to the processor 104 to announce that the register 102 has the required data. In this case, the processor 104 will stop the current procedure and to process the previous unfinished procedure.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method for accessing digital data information, comprising:
    accessing data from a register with a processor;
    if the data in the register is valid, continuously accessing the data with the processor;
    if the data in the register is invalid, enabling an identifier register with the processor and waiting for an interrupt signal, wherein the processor processes other procedures during the waiting time for the interrupt signal;
    when a predetermined ratio of the capacity of the register is loaded with new data and the identifier register is enabled, transmitting the interrupt signal to the processor;
    when the processor receives the interrupt signal, disabling the identifier register with the processor and stopping transmitting other interrupt signal; and
    accessing the new data from the register with the processor.

2. The method of claim 1, wherein the register is a FIFO (First-In First-Out) register.

3. The method of claim 1, wherein the step of enabling the identifier register is to set the content of the identifier register to 1, and the step of disabling the identifier register is to set the content of the identifier register to 0.

4. The method of claim 1, wherein the predetermined ratio is larger than 50%.

5. The method of claim 1, wherein to determine the data in the register is valid is to determine there are data recorded in the register.

6. The method of claim 1, wherein to determine the data in the register is invalid is to determine there is no data recorded in the register.

7. A data processing method, comprising:
    accessing data from a register with a processor;
    when there is no data recorded in the register, setting the content of an identifier register to be enabled, wherein the processor waits for an interrupt signal and processes other procedures during the waiting time for the interrupt signal;
    when a predetermined ratio of the capacity of the register is recorded with the data and the content of the identifier register is enabled, transmitting the interrupt signal to the processor;
    when the processor receives the interrupt signal, setting the content of the identifier register to be disabled and stopping transmitting other interrupt signals; and
    accessing the data from the register with the processor.

8. The method of claim 7, wherein the register is a FIFO register.

9. The method of claim 7, wherein the predetermined ratio is larger than 50%.

10. A data processing device, comprising:
    a register, which is for temporarily storing data;
    a processor, which is capable of accessing the data from the register;
    an identifier register, which indicates whether to transmit an interrupt signal to the processor; and
    a monitoring unit, which monitors that whether a predetermined ratio of the capacity of the register is recorded with new data, wherein the content of the identifier register is set to 1 when the data accessed from the register with the processor are invalid, the processor waits for the interrupt signal and processes other procedures during the waiting time for the interrupt signal, the interrupt signal is transmitted to the processor when the predetermined ratio of the capacity of the register is recorded with the new data, and the identifier register is set to be enabled, and the content of the identifier register is set to be disabled for stopping transmitting other interrupt signals and the data of the register are accessed when the processor receives the interrupt signal.

11. The device of claim 10, wherein the register is a FIFO register.

12. The device of claim 10, wherein the predetermined ratio is larger than 50%.

* * * * *